March 26, 1946.  E. H. LAND  2,397,274
RANGE FINDER
Filed March 2, 1943
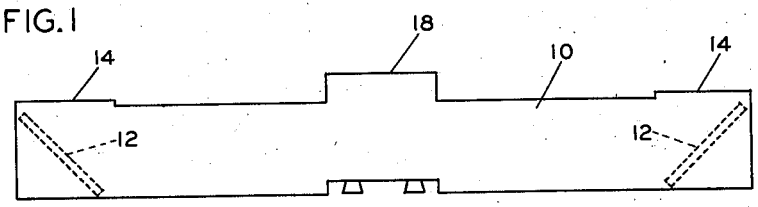
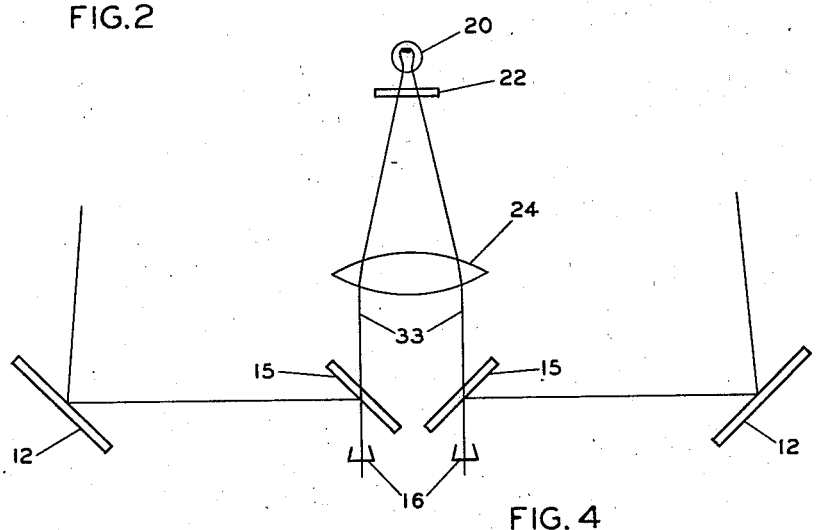
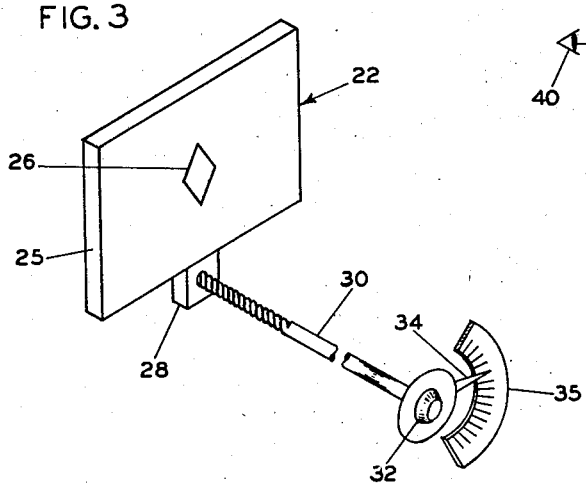
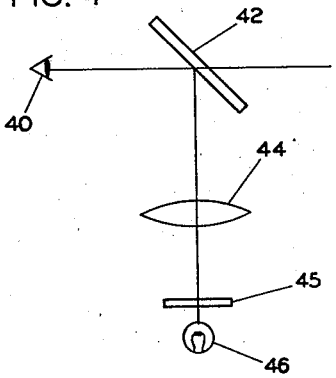
Edwin H. Land
INVENTOR.
BY Donald L. Brown
Attorney Patented Mar. 26, 1946

2,397,274

UNITED STATES PATENT OFFICE 2,397,274

RANGE FINDER

Edwin H. Land, Cambridge, Mass., assignor to Polaroid Corporation, Cambridge, Mass., a corporation of Delaware Application March 2, 1943, Serial No. 477,709

9 Claims. (Cl. 88—2.6)

This invention relates to a new and improved range finder and reticle system therefor.

It is one object of the invention to provide a new and improved range finder comprising means for impressing an optical mark or other indicia upon the field of view and comprising also means for bringing said mark into apparent coincidence with the plane of an object in said field and thereby computing the distance of said object from the observer.

Another object is to provide a range finder of the above type wherein the optical mark is produced by means of a collimating lens and a suitable reticle element positioned in line with the axis of said lens, and wherein means are provided for causing relative motion between said reticle element and said lens along said axis and thereby varying the position of said reticle element with respect to the focal point of said lens.

A further object is to provide a range finder of the above characteristics wherein said reticle system is coupled with a system of mirrors adapted to give an increased stereoscopic effect to the field of view.

Additional objects and advantages will in part appear and in part be pointed out in the course of the following description of one or more embodiments of the invention, which are given as non-limiting examples, in connection with the accompanying drawing, in which:

Figure 1 is a plan view of a housing suitable for a range finder constituting an embodiment of the invention;

Fig. 2 illustrates diagrammatically and in plan the optical elements employed in one embodiment of the invention;

Fig. 3 is an enlarged diagrammatic view, in perspective, partly broken away, illustrating certain details of apparatus suitable for use in combination with the optical system shown in Fig. 2 for producing and controlling the apparent position upon the field of the indicia mentioned heretofore; and Fig. 4 is a side view similar to Fig. 2, illustrating a modification of the invention.

In the form of the invention illustrated in the drawing, housing 10 of any desired size and shape is provided with a pair of mirrors or other reflecting surfaces 12 adapted to receive light from in front of the instrument through the windows or apertures at 14. This arrangement serves both to provide an effectively enlarged interocular distance or increased stereoscopic effect, and also to limit the field of view to an area substantially in front of the instrument. Associated with mirrors 12 is a pair of transparent mirrors 15, each of which is adapted to receive light from one of mirrors 12 and to reflect it towards one of eyepieces 16.

An observer employing this range finder will look simultaneously through both of eyepieces 16 with the result that his right eye will receive light from right-hand mirrors 12 and 15, and his left eye will simultaneously receive light from left-hand mirrors 12 and 15. It is to be understood that mirrors 15 and mirrors 12 should be so positioned as to enable an observer employing the instrument to see substantially the same field with each eye. Such a structure, except for the use of transparent mirrors 15 instead of wholly reflecting surfaces, is standard in the construction of range finders of the class of the present invention. Its effect and purpose is to increase the effective interocular distance of the observer by the distance between mirrors 12, and thus to increase considerably the stereoscopic acuity of his vision as applied to the field.

One form of reticle system suitable for use in the invention is illustrated in detail in Figs. 2 and 3, and may conveniently be located within an extended portion 18 of housing 10. It comprises a light source 20 of any desired type, a reticle 22, and a relatively large lens 24 or other device for collimating the rays emanating from source 20 and traversing reticle 22. The term "reticle" as it is used herein and in the claims is to be understood as having the meaning commonly accorded thereto in the range finder art, and it is to be understood as including any means in the optical system of the instrument for producing visible indicia, such for example as a line, a dot, or a circle or other figure.

In the embodiment of the invention shown in Figs. 2 and 3, reticle 22 comprises a plate or sheet 25 of any suitable material bearing thereon a reticle mark 26. For example, element 25 may comprise a small glass plate, and mark 26 may comprise an outline or solid area reproduced thereon, as for example by means of a metal. Alternatively, element 25 may be opaque except for an etched area defining mark 26, and many similar arrangements will be apparent to those skilled in the art.

In operation, reticle 22 will preferably be positioned within the instrument in such manner that reticle mark 26 will lie in line with the axis of lens 24. Means are also provided for causing motion of reticle 22 along the axis of lens 24, such for example as a nut or similar element 28 secured to reticle 22 and engaged by threaded shaft 30, which may in turn extend to a position outside housing 10 where a knob 32 may be readily manipulated by the operator of the instrument. It will, of course, be understood that shaft 30 rotates without lengthwise motion.

It is believed that the operation of the above-described embodiment of the invention will now be apparent. If it be assumed first that reticle 22 is positioned at the focal point of lens 24, it will be seen that the rays emanating from light source 20 and traversing said reticle will be collimated by lens 24 as they are transmitted to eyepieces 16. To an observer looking through said eyepieces, therefore, reticle mark 26 will appear to be at infinity. If, however, reticle 22 is caused to move along the axis of lens 24 and inside the focal point thereof, rays 33 will change in direction from parallelism and will diverge slightly in passing to eyepieces 16. This action will in turn cause the eyes of the observer in viewing the image of mark 26 to converge slightly, and will thus cause said image to appear to move from infinity nearer to the observer. Furthermore, the greater the distance between mark 26 and the focal point of lens 24, the greater will be the angle of convergence between the eyes of the observer and the nearer the image of said mark will appear in the field.

The relation between the apparent position of the image of mark 26 and the field depends largely upon the angular relation of mirrors 12 and 15 and the base line of the instrument, i. e. the distance between mirrors 12. If mirrors 15 are at right angles to each other and parallel to their associated mirrors 12, the reticle mark will appear to lie at infinity with respect to space when reticle 22 is at the focal point of lens 24, and will appear to move nearer with respect to the field as reticle 22 moves nearer to the lens. If, however, mirrors 15 are at right angles to each other and mirrors 12 are at an angle of less than 90 degrees to each other, or vice versa, the reticle mark will appear to lie nearer in space than infinity when reticle 22 is at the focal point of lens 24, and will appear to move still nearer as the reticle is moved towards the lens. Similarly, if reticle 22 is caused to move beyond the focal point of lens 24, the reticle mark will appear to move further away from the instrument.

Fig. 3 illustrates scale means adapted to indicate the range of the apparent position of the reticle image, said means comprising pointer 34 fixed to knob 32 and cooperating with scale 35 mounted in any suitable way on or within housing 10. Scale 35 may read in any desirable unit of measurement, for example yards, and should be so adjusted with respect to pointer 34 that the range opposite the pointer will be a maximum when reticle 22 is at the farthest limit of its relative motion with respect to lens 24, and will be a minimum when said reticle and lens are at their closest relative positons. It will be understood that the calibration of scale 35 is determined both by the base line of the instrument and by the angular relations of mirrors 12 and 15. It will also be apparent that there may advantageously be a suitable vernier system between knob 32 and shaft 30 and/or pointer 34 in order to cause relatively slight motion of reticle 22 and pointer 34 with relatively greater rotation of knob 32, thus making it possible to obtain a more sensitive scale.

In using the above-described embodiment of the invention, the observer first preferably adjusts the range finder so that the image of reticle mark 26 is substantially in line with an object in the field of view whose distance it is desired to determine. Said image will in all probability appear to be in a different plane from said object, either in front of or behind it in space. The operator then turns knob 32 until said image appears to lie in the same plane as the object whose range is being measured, and he may then read said range directly from scale 35.

It will be understood that the above-described apparatus and system are given merely as illustrative of an operative embodiment of the invention, and that many changes and modifications may be made therein without departing from the scope of the invention. For example, many mechanical changes may be made in the control apparatus shown in Fig. 3. It will be apparent also that instead of using a separate reticle 22, light source 20 may itself serve as the reticle and may be mounted for relative movement with respect to the focal point of lens 24. Alternatively, the reticle element may be stationary and means may be provided for causing movement of lens 24 along the axis thereof in order to vary the relation between its focal point and the reticle.

It has been pointed out that it is preferable for reasons of convenience to position reticle 22 substantially in line with the axis of lens 24, but this arrangement is not essential. Reticle 22 may be mounted outside said axis, provided it may be moved with respect to the focal plane of the lens.

To a considerable extent the construction of the range finders of the present invention is determined by the purpose for which they are intended. For example, mirrors 12 and 15 are used as illustrated in Figs. 1 and 2 for the purpose of increasing the range of the instrument and its accuracy at increased ranges. However, this construction may be modified if the instrument is designed for use at relatively shorter ranges, i. e. of the order of 100 yards or less. For such short ranges, it may be desirable to rely only upon the human interocular, and Fig. 4 illustrates diagrammatically a modification of the invention suitable for such use. One eye of the observer is indicated at 40 as viewing the field through a single transparent mirror 42, and the reticle system comprises a light source 44, reticle 45, and lens 46. Many other modifications will doubtless be apparent to those skilled in the art, and are to be construed as coming within the scope of the invention.

It is also to be understood that the following claims are intended to cover all the generic and specific features of the invention herein described, and all statements of the scope of the invention which, as a matter of language, might be said to fall therebetween.

What is claimed is:

1. In a binocular range finder, in combination, a reticle, means for superimposing a single image of said reticle upon the field of view, said image being at all times visible to both eyes of an observer a collimating lens positioned between said reticle and the eyes of an observer, and means for altering predeterminedly the distance between said reticle and the focal plane of said lens to alter the apparent position of said image upon said field of view.

2. In a binocular range finder, in combination, a reticle, a collimating lens positioned between said reticle and the eyes of an observer, transparent mirror means between said lens and the eyes of an observer for superimposing a single image of said reticle upon the field of view, said image being at all times visible to both eyes of an observer and means for altering predeterminedly the distance between said reticle and the focal plane of said lens to alter the apparent position of said image upon said field of view.

3. In a binocular range finder, in combination, a reticle, means for superimposing a single image of said reticle upon the field of view, said image being at all times visible to both eyes of an observer a collimating lens positioned between said reticle and the eyes of an observer, means for altering predeterminedly the distance between said reticle and the focal plane of said lens to alter the apparent position of said image upon said field of view, and means responsive to said last-mentioned means for determining the distance from said range finder to the apparent position of said reticle image within said field of view.

4. In a binocular range finder, in combination, a reticle, means for superimposing a single image of said reticle upon the field of view, said image being at all times visible to both eyes of an observer a collimating lens positioned between said reticle and the eyes of an observer, means for positioning said reticle substantially on the axis of said lens, and means for altering predeterminedly the distance between said reticle and said lens along said axis to alter the apparent position of said image upon said field of view.

5. In a binocular range finder, in combination, means for increasing the effective interocular of an observer, a reticle, means for superimposing a single image of said reticle upon the field of view, said image being at all times visible to both eyes of an observer a collimating lens positioned between said reticle and the eyes of an observer, means for positioning said reticle substantially on the axis of said lens, and means for altering predeterminedly the distance between said reticle and said lens along said axis to alter the apparent position of said image upon said field of view.

6. In a binocular range finder, in combination, a reticle, means for superimposing a single image of said reticle upon the field of view, said image being at all times visible to both eyes of an observer a collimating lens positioned between said reticle and the eyes of an observer, means for positioning said reticle substantially on the axis of said lens, means for altering predeterminedly the distance between said reticle and said lens along said axis to alter the apparent position of said image upon said field of view, and means responsive to said last-mentioned means for determining the distance from said range finder to the apparent position of said reticle image within said field of view.

7. In a binocular range finder, in combination, a reticle, means for superimposing a single image of said reticle upon the field of view, said image being at all times visible to both eyes of an observer a collimating lens positioned between said reticle and the eyes of an observer, means for positioning said reticle substantially on the axis of said lens, means for altering predeterminedly the distance between said reticle and said lens along said axis to alter the apparent position of said image upon said field of view, and means for determining the distance from said range finder to the apparent position of said reticle image within said field of view.

8. In a binocular range finder, in combination, a reticle, means for superimposing a single image of said reticle upon the field of view, said image being at all times visible to both eyes of an observer a collimating lens positioned between said reticle and the eyes of an observer, means for positioning said reticle substantially on the axis of said lens, and means for moving said reticle to alter predeterminedly the distance between said reticle and said lens along said axis and thereby to alter the apparent position of said image upon said field of view.

9. In a binocular range finder, in combination, a reticle, a collimating lens positioned between said reticle and the eyes of an observer, means for increasing the effective interocular of an observer and for superimposing a single image of said reticle upon the field of view, said image being at all times visible to both eyes of an observer, said means comprising a pair of reflecting surfaces and a pair of transparent mirrors intermediate said reflecting surfaces and between said lens and the eyes of an observer, means for positioning said reticle substantially on the axis of said lens, means for moving said reticle to alter predeterminedly the distance between said reticle and said lens along said axis and thereby to alter the position of said image upon said field of view, and means responsive to said last-mentioned means for determining the distance from said range finder to the apparent position of said reticle image within said field of view.

EDWIN H. LAND.